March 13, 1956

R. K. BEAN 2,737,846

ELLIPSOIDAL REFLECTOR PROJECTOR FOR
STEREO-PHOTOGRAMMETRIC MAP PLOTTING

Filed Oct. 10, 1952

INVENTOR
RUSSELL K. BEAN
BY
H. L. Godfrey
ATTORNEY

March 13, 1956 R. K. BEAN 2,737,846
ELLIPSOIDAL REFLECTOR PROJECTOR FOR
STEREO-PHOTOGRAMMETRIC MAP PLOTTING
Filed Oct. 10, 1952 5 Sheets-Sheet 3

INVENTOR
RUSSELL K. BEAN
BY
H. L. Godfrey
ATTORNEY

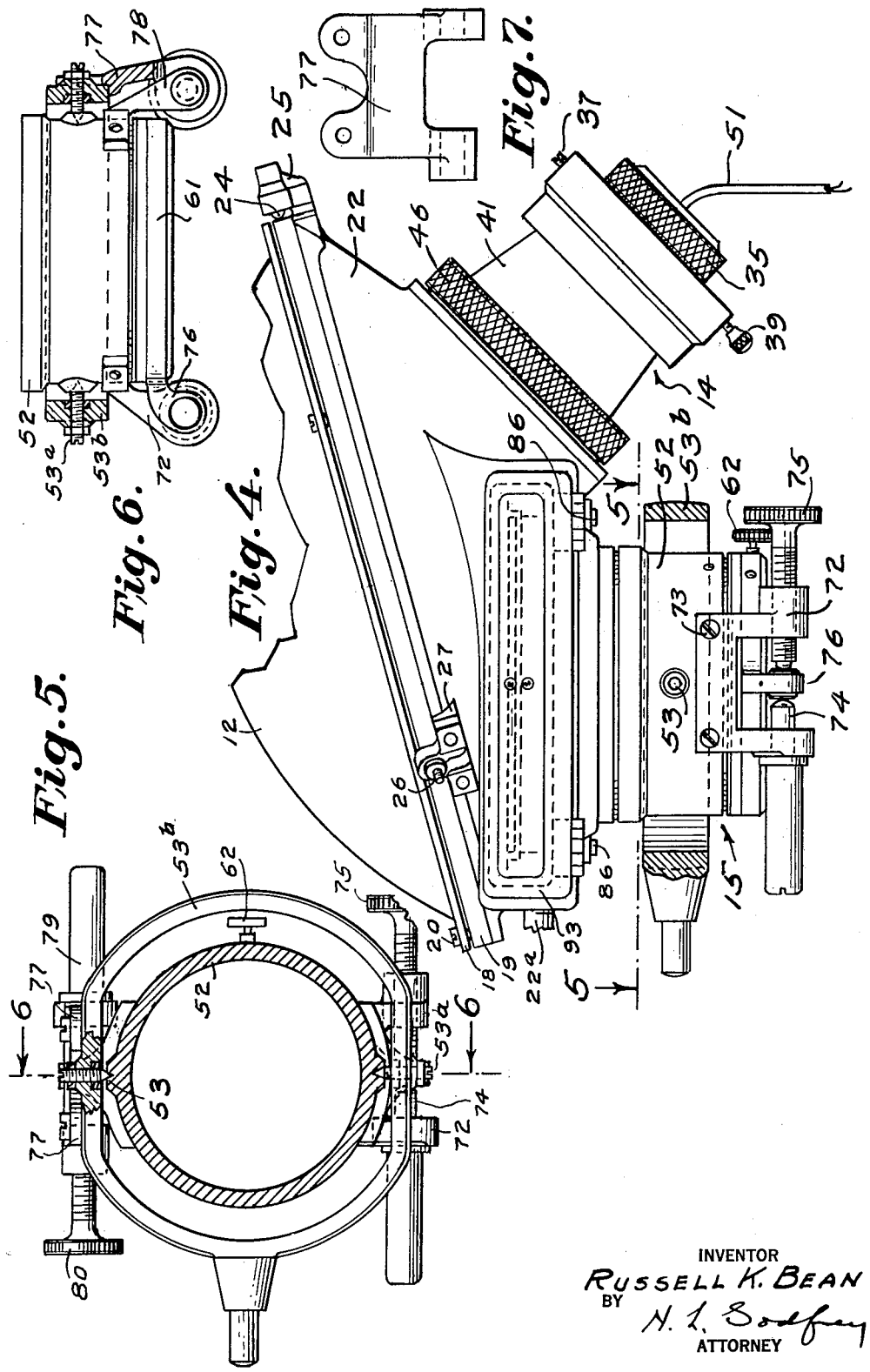

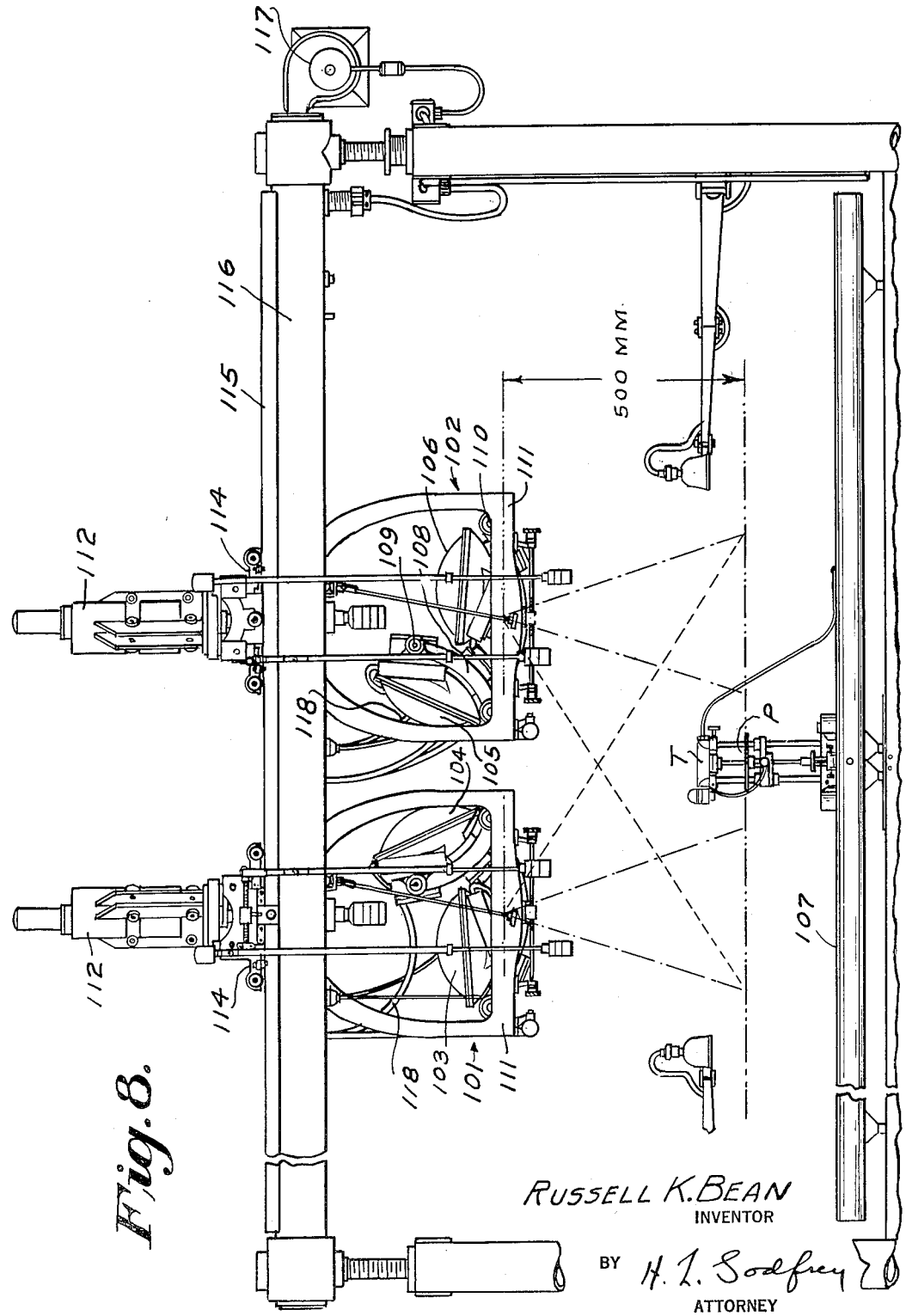

United States Patent Office 2,737,846
Patented Mar. 13, 1956

2,737,846

ELLIPSOIDAL REFLECTOR PROJECTOR FOR STEREO-PHOTOGRAMMETRIC MAP PLOTTING

Russell K. Bean, McLean, Va., assignor to the United States of America as represented by the Solicitor of the Department of the Interior Application October 10, 1952, Serial No. 314,232

4 Claims. (Cl. 88—24)

(Granted under Title 35, U. S. Code (1952), sec. 266)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to a device for collecting and transmitting light and, more particularly, is concerned with reflecting and projecting devices for use in stereoplotting systems and for other applications requiring uniform and concentrated illumination.

In stereoplotting instruments of the direct optical projection type, it is necessary that the diapositive plates be large enough to afford adequate imagery. The problem of providing adequate illumination of the stereoscopic model, without resorting to the extreme size and weight required in a condenser composed of lenses, has a direct bearing on the economy and efficiency of the plotting system. In the past, this problem has been met either by decreasing the size of the diapositive plate containing the aerial view, and thereby reducing the size of the condenser system, or by providing a movable condenser and light source. Each of these systems has a major disadvantage. The system employing the diapositive of reduced size gives relatively poor image definition because of the inadequacy of the illumination and because of the reduced image size in relation to grain size. The system employing the movable condenser and light source is subject to mechanical defects in the moving parts and to vibration arising from the mechanical driving arms or connecting linkage; furthermore, the mechanical attachments required for the movable light system make the use of this instrument for aerial triangulation a cumbersome procedure.

An object of this invention is to provide an improved reflector for collecting and transmitting light.

Another object of this invention is to provide a new and improved optical projector.

Another object of this invention is to provide a projector for stereoplotting with no moving parts required for model illumination but which will, at the same time, be light in weight and of sufficient size to allow a larger diapositive than is used in existing fixed light source instruments.

Another object is to provide a projector of compact and convenient shape and size in which the over-all vertical dimension of the projector is smaller than the corresponding dimension of any previously developed projector of equal performance.

Another object of the invention is to provide a reflecting device whose optical qualities are at least equal to the qualities of precision condenser lens systems.

Another object is to eliminate chromatic and other aberrations that are inherent in condenser lens systems.

Another object is to provide a projector of the type described which can be reproduced in large quantities more economically than either condenser elements of glass or moving type illuminating systems.

To accomplish these objectives an ellipsoidal reflecting mirror is employed. By placing the light source at one focus of the ellipsoidal reflector and the projection lens at the other focus, all light rays which emanate from the light source and strike the reflecting surface are directed towards the lens. The reflector conforms to a portion of a prolate ellipsoid of revolution so configurated and oriented that, when a diapositive is correctly positioned in the system at the appropriate principal distance from the lens, a complete bundle of light rays, emanating from the light source, is reflected from the ellipsoidal surface in such a manner as to encompass the entire area of the diapositive and pass thence through the lens as a perspective center. In this manner, the available light is used with a high degree of efficiency. No light rays pass directly from the light source to the lens through the diapositive. As a result, there is no "hot spot" caused by direct light rays as in previous systems, and the light distribution is relatively even. By inserting colored (or polarized) filters, or a synchronized shutter arrangement, and by inserting diapositive plates at the proper locations in the system, a space model having high qualities of brightness and definition is produced when viewed through spectacles corresponding to the filters or synchronized with the shutter arrangements.

This apparatus constitutes a new projecting device for stereoplotting, having very desirable qualities of versatility and economy. It can be adapted to utilize either vertical or oblique aerial photography. It can readily be used for aerial triangulation. The increased brightness and definition of the stereoscopic model permit the use of aerial photography at a higher altitude without loss of accuracy; this higher altitude, in turn, reduces the number of control points required, resulting in marked economies in the over-all procedure of aerial mapping, as compared to the operating cost with previous stereoplotting projectors of the direct optical projection type.

In addition to its use in stereoplotting instruments of the direct optical projection type, the principle of this invention can be used in other types of stereoplotting instruments, in enlarging or rectifying equipment, in microscopes for slide illumination, as a light gathering means for determining light values, and for many other uses in which a concentrated source of light and freedom from chromatic aberrations would be advantageous.

In the drawings:

Fig. 4 is a side elevation view, corresponding to sectional view shown in Fig. 2 but further showing mounting and adjusting attachments.

Fig. 5 is a sectional view taken on the line 5—5 of Fig. 4 looking in the direction of the arrows.

Fig. 6 is a sectional view taken on the line 6—6 of Fig. 5 looking in the direction of the arrows.

Fig. 7 is a detail view of the tilt adjusting bracket on the mount shown in Figs. 4–6.

Fig. 8 is an elevational view illustrating the manner in which the projectors of this invention may be mounted in an assembly for stereoplotting.

Figure 1:
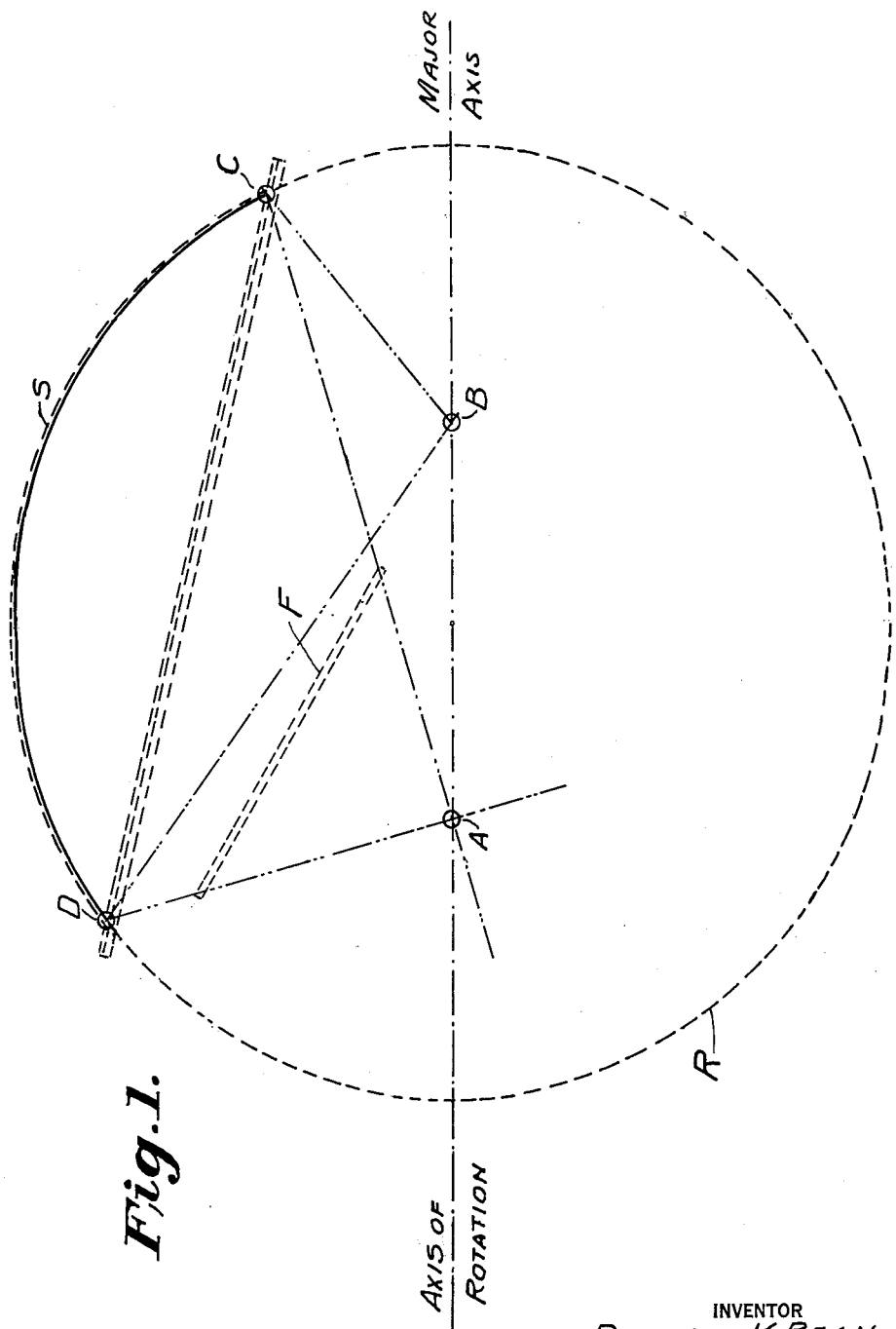
Fig. 1 is a sketch showing diagrammatically the manner in which the reflecting surface is derived from a prolate ellipsoid of revolution and illustrating the principles of this invention.
Figure 2:
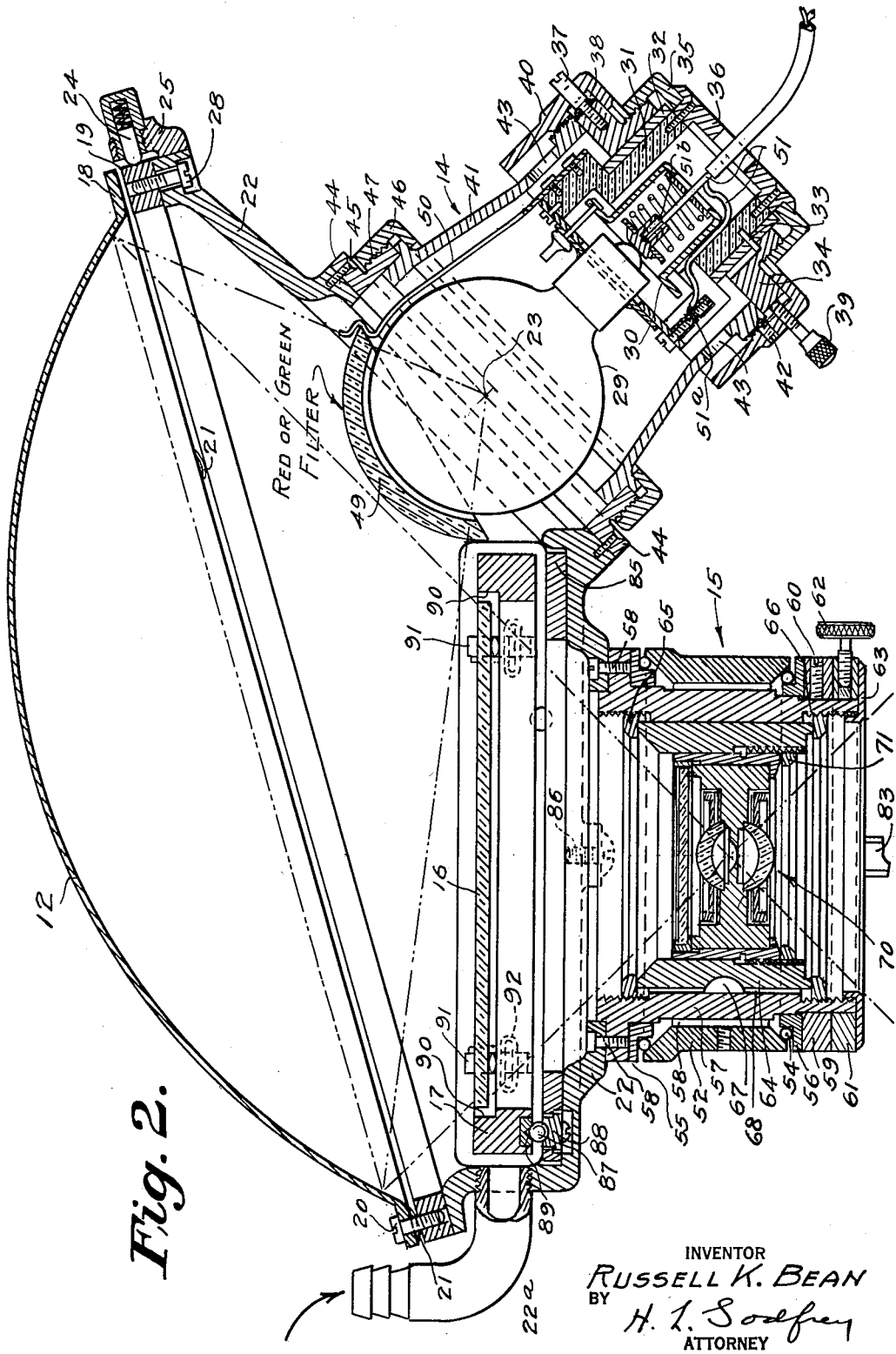
Fig. 2 is an elevational view in section showing a projecting device incorporating the principles of this invention.
Figure 3:
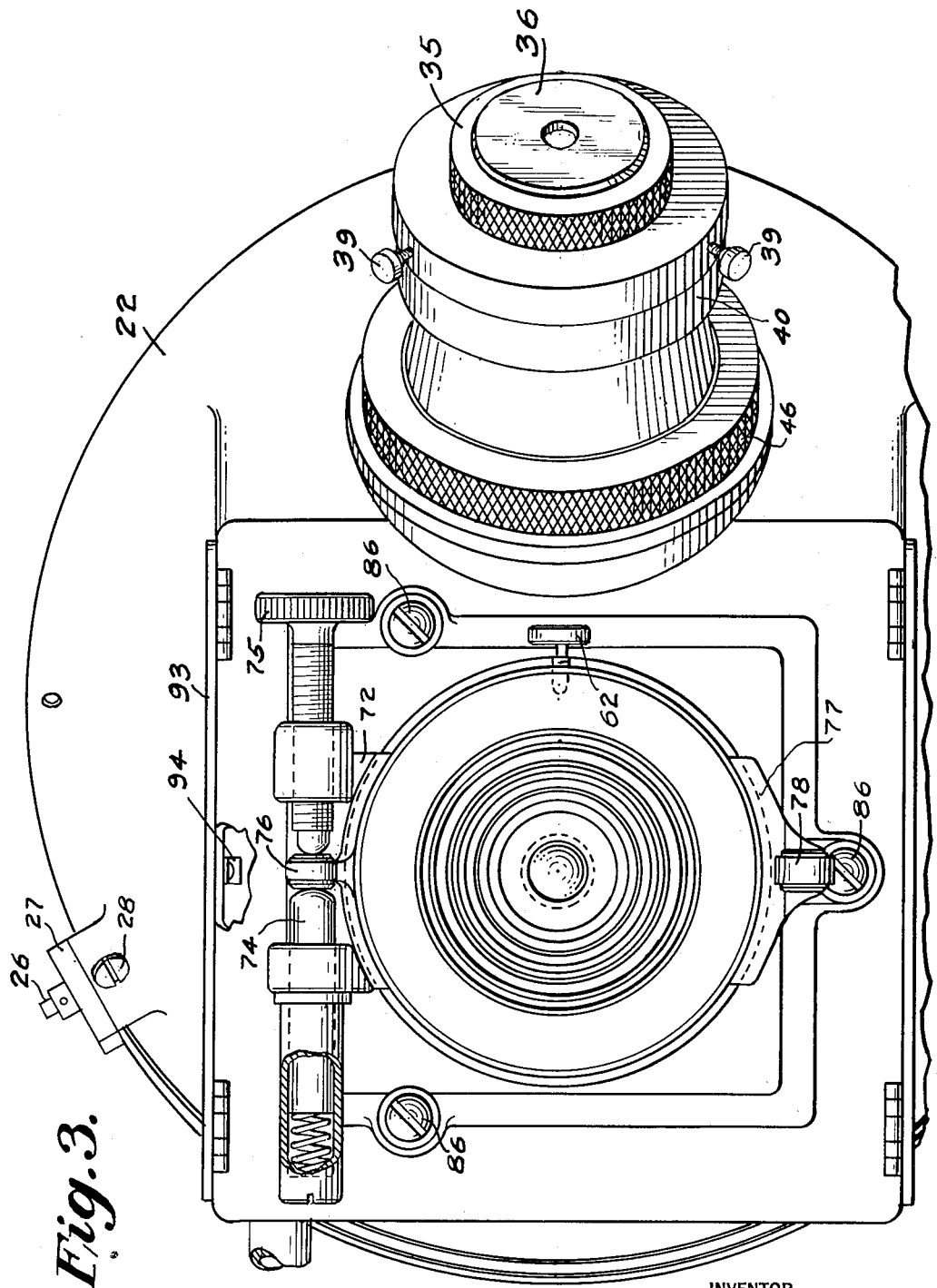
Fig. 3 is a bottom view, partially broken away, of the device shown in Fig. 2.

Referring now to Fig. 1 of the drawings, the solid line S is an outline of a section of a prolate ellipsoidal surface which may be considered as having been formed around an ellipsoid of revolution the outline of which would be in the position shown by the broken line R. The principal foci of the ellipsoid are at points A and B. A reflecting surface of such an ellipsoid theoretically is a perfect mirror, i. e., light waves emanating from one focal point as at B, are reflected from every point of the reflecting surface S to the other focal point A. The present invention preferably utilizes approximately that portion of the ellipsoidal surface as a reflecting surface as shown, for example, in outline by the solid line S between the points C and D. This portion is unsymmetrically located with respect to the foci A and B, i. e., canted from the major axis and is symmetrical with respect to a plane containing the major axis, but is not intersected by the major axis.

To illustrate the principle of the invention, consider an image F positioned in the path of a converging bundle of light waves reflected by surface S from a light source at B to the focus A. An image placed out of the path of direct rays from the light source at B will receive light rays only from reflecting surface S, and accordingly, a projection of the image through the focus A will be free of aberrations that are characteristic of condensing lens systems, and also will be free of so-called hot spots due to superimposed direct rays or of dark spots from the shielding of superimposed direct rays. It will be noted that the latter could not be avoided in an ellipsoidal reflector in which the major axis passes through the reflecting surface.

As previously stated, the reflector of the present invention preferably utilizes approximately that portion of a prolate ellipsoidal surface as shown between the points C and D in Fig. 1. This shows approximately the optimum coverage on the ellipsoidal surface for a standard wide-angle (approximately 93°) projecting lens at the focal point A. This type lens is preferably used in stereoscopic projectors utilizing the ellipsoidal reflector of this invention thereby permitting the use of large diapositive plates. With other lens systems a greater portion of the reflecting surface of an ellipsoid could be used without departing from the principles of this invention provided it is not intersected by the major axis. It will also be apparent to those skilled in the art that smaller portions of an ellipsoidal reflecting surface could be utilized. It will be noted that the reflecting surface S as shown in Fig. 1 collects a cone or bundle of light rays through a large angle from the focal point B and converges them through a smaller angle to the focal point at A, thus effecting a concentration of the light at A and providing greater illumination than possible with the usual direct condensing lens systems. This is accomplished by locating the reflecting surface in an unsymmetrical position with respect to the foci. It will be understood that a symmetrical portion of the reflecting surface could be employed but at a sacrifice of maximum illumination.

To illustrate an alternate use of this system, consider the lens at A (Fig. 1) to be replaced by some other suitable viewing device, such as, for example, the optics of a microscope. This system would then afford a very high degree of illumination of the slide placed at F.

To illustrate another alternate use of the system, consider the light source at B to be replaced by an instrument for measuring light values. The illumination of any object placed in the optical field below the lens may then be measured, inasmuch as the total light passing through the lens H would be reflected from the ellipsoidal surface to the measuring device at B, the slide F in this instance long removed from the system. In this instance the ellipsoidal reflecting surface acts as a means for gathering light outside the system.

The ellipsoidal reflectors employed by the device of this invention may be fabricated by electroforming a glass blank made in the form of an extremely precise prolate ellipsoid of revolution, and by then removing the shell so formed. Silver or aluminum may first be electroformed on the glass blank to form the reflecting surface and coatings of other metals may be added. If desired, a rim or flange may first be placed on the glass blank to define the area of the reflecting mirror and may form a part of the completed reflector after the electroforming operation. Three ellipsoidal reflectors of the area shown in the drawings may be fabricated by a single electroforming operation by removing properly located portions of the shell from about the ellipsoid blank.

Figures 2–7 show one embodiment of the principle illustrated in Fig. 1, which comprises a projector for stereoplotting consisting of an ellipsoidal reflecting surface 12, an adjustable light source generally indicated at 14, and an adjustable projection lens system and mounting assembly indicated at 15, which can be accurately calibrated in relation to a diapositive plate 16 and its holder 17.

This projector may be used in stereoplotting to project vertically downward as in the well-known "Multiplex" system, or may be used as one of a convergent pair of projectors whose axes make an angle of 20° with the vertical and 40° with each other in a system known as "Twinplex," disclosed in co-pending application serial No. 234,430 filed June 29, 1951, now Patent No. 2,696,752 dated December 14, 1954, and as further illustrated in Fig. 8 to be described below. The mounting means shown in connection with Figs. 4–7 are similar to those conventionally employed for mounting projectors for direct vertical projection.

The ellipsoidal reflector 12, which may be electroformed as described above, is provided with a flange 18 which may be made integral with the reflector during the electroforming. Flange 18 is secured to a ring 19 by means of screws 20. Spacer means, such as spring washers 21, space reflector 12 slightly away from the ring 19 in order to provide for passage of cooling gases. The reflector 12 and ring 19 are mounted upon main body casing 22 which is arranged to receive the members of the assembly in such a manner that one focal point of the prolate ellipsoidal reflecting surface is at lamp filament 23 and the other focal point is in the center of the nodal area of the projection lens. The diapositive 16 is positioned in a plane approximately perpendicular to the axis of the cone of rays from the reflecting surface to the lens. In the reflector shown, the angle between the plane containing the diapositive and the major axis through the filament and lens as focal points of the reflector is approximately 37°.

Cooling gases may be introduced into the body casing 22 through a suitable inlet 22a. These gases pass over the diapositive and out between the reflector 12 and ring 19. Some of the cooling gases also pass over the lamp and out through openings provided in the lamp housing in a manner herein after described.

The ring 19 is adjustably mounted on the casing 22 as by means of spring loaded plunger 24, which is held to the main body casing 22 by means of bracket 25, and which bears upon the outer portion of ring 19 and presses it against opposed adjusting screws 26 (Figs. 3 and 4) similarly mounted by brackets 27 on the main body casing 22 and spaced 120° apart. Hold-down screws 28 which may be 3 in number, one beneath each of the brackets 25 and 27, may be tightened after suitable centering adjustments of the mirror have been made.

The light source 14 may comprise a standard 5 amp., 20 volt bulb 29 and socket 30 which is mounted in a socket base 31, of a suitable insulating material such as phenolite, fitted into a bearing sleeve 32. An aligning pin 33 fitted into bearing sleeve 32 and phenolite base 31 projects into a slot in lamp centering body 34 thereby preventing rotation of bearing 32 with respect to the lamp centering body. A threaded adjusting ring 35 held by a cap 36 allows adjustment of the lamp along its central axis. Spring anchor pin 37 and leaf spring 38 together with two adjusting screws 39 spaced 120° radially in lamp centering body 34 allow an adjusting motion in a plane at right angles to the central axis of the lamp. The lamp may thereby be given a limited adjustment in any direction.

The lamp centering body 34 is held by a lamp centering ring 40 against a lamp housing 41 just tight enough to allow sliding motion of the lamp centering body between the centering ring and the lamp housing 41. The lamp centering ring 40 can be locked by a set screw 42 to the lamp housing 41. A plurality of holes 43 in the lamp housing under the lamp centering ring 40 permit circulation of air from inside the casing 22 downwardly around the lamp. It will be noted that a portion of the lamp centering ring acts as a skirt to prevent outside light from entering through the ventilating holes 43.

A mounting flange 44 for receiving the lamp housing 41 is fixed to main body casing 22 by means of screws 45. Threaded mounting ring 46 engages threaded portion 47 of the mounting flange 44 and thereby holds the housing 41 and lamp assembly in place. This ring 46 may be knurled as shown in Fig. 4 to facilitate removal and replacement of the lamp assembly. An aligning pin or other means (not shown) prevents rotation of lamp housing 41 with respect to the mounting ring and body casing.

The lamp 29 is provided with a red or a green filter 49 which is held in position by spring clips 50 attached to the socket base 31. Wires 51 suitably connected as at 51a and 51b connect the lamp 29 to a suitable power source.

The lens assembly and mounting means 15 will now be described. Outer bearing ring 52 is provided with suitable diametrically opposed holes 53 (Fig. 4) for accommodating pivot pins 53a of a suitable mounting bracket or ring 53b such as shown in Figs. 4–7. This mounting bracket is similar to those used for mounting conventional direct projectors, and accordingly, is only partially shown to illustarte the manner in which it may be attached to the projector of this invention.

The projector assembly is mounted for rotation about a central vertical axis within the ring 52 by means of ball bearings 54, bearing retainer rings 55 and 56 and inner bearing ring 57. Inner bearing ring 57 is secured to the main body casing 22 by means of screws 58, and holds the lens assembly in a manner hereinafter described. The bearing rings 55 and 56 are held in place by threaded lock ring 59 secured from rotation by set screws 60. A clamp ring 61 may be locked to the inner bearing ring 57 by means of lock screw 62 and lock shoe 63.

A sleeve 64 for holding the lens assembly is secured within the inner bearing ring 57 by means of upper lock ring 65 and lower lock ring 66, and is prevented from rotation by Woodruff key 67 engaged by slot 68 in the inner surface of ring 57. The lens assembly may be adjusted along the optical axis by adjusting the upper and lower lock rings 65 and 66 as desired. By this means the nodal point of the lens may be located in the proper relation to the diapositive plate and reflecting surface. The principal distance is thereby properly established.

The central opening of sleeve 64 is parallel to its sides when the projector is to be used for direct vertical projection as in the "Multiplex" system. A similar sleeve but with a canted central opening for holding the lens assembly is used when the projector is to be employed for oblique angle projection. In the latter instance an angle of about 2° is provided to satisfy the Scheimpflug condition.

The lens assembly generally designated as 70 which may be, for example, a conventional 49.55 mm. f/12.5 hypergon lens assembly and need not be described in detail, is held in place within sleeve 64 by means of lock ring 71. As aforestated, this type lens may receive and project rays through an angle of approximately 93°.

As shown in Figs. 3–7, the projector may be rotatably adjusted with respect to bearing ring 52 and its mounting bracket by means of swing bracket 72 attached to ring 52 by screws 73 and carrying spring loaded plunger 74 and opposing thumb screw 75 working on lug 76 secured to clamp ring 61.

By releasing the lock screw 62 on clamp ring 61, the projector may be swung through an angle of 360° or until it is approximately in position. Lock screw 62 is then tightened, and finer rotational adjustments are made by means of thumb screw 75. By this means rotation about the axis commonly known as the Z axis is accomplished.

When the projector is used in the vertical or "Multiplex" mount, a tilt bracket 77 is attached to the bearing ring 52 and is provided with a projecting lug 78, adapted to be operated by an opposed plunger 79 and thumb screw 80 similar to that shown in connection with the swing bracket 72, but associated with the mounting ring. This permits adjustment of tilt or rotation about the X-axis. Rotation about the Y-axis is accomplished by rotating the shaft holding the mounting bracket in a manner similar to that used in the multiplex and the other known mounts. Means for rotation of the projector about the X, Y, and Z axes from the nodal point of the lens are thereby provided.

The diapositive plate holding assembly comprises an aligning ring 85 secured to the floor of the body casing 22 by means of screws 86. Attached to the aligning ring 85 are three upright studs 87 spaced 120° apart about the optical center. These studs, as shown, may be balls fixed to the aligning ring by any suitable means as shown at 88. Plate holder 17, which may be substantially square with a cylindrical central aperture as shown, is provided with three V-ways 89 which are so spaced as to engage studs 87 and thereby center the plate holder at the proper position so that the principal point of the previously positioned diapositive plate 16 is in correct relation to the projection lens.

Plate holder 17 is recessed as at 90 for receiving the diapositive plate 16. The plate 16 is positioned in the recess 90 of the plate holder. Hold-down clamps 91, which may be four in number, are then swung in place and are tightened by means of knurled nuts 92 provided in a recess in the edge of the plate holder 17.

In operation, the diapositive plate 16 is first positioned in the plate holder 17 and the assembly is then inserted through the hinged door 93 in casing 22 until the holder 17 falls in place upon the studs 87. The door 93 is then closed and held in closed position by spring clip 94, and other adjustments as previously described may be made, or, if the projector has already been properly adjusted and calibrated, stereoplotting operations may be started.

In operation, after proper adjustments have been made light rays emanating from the light source of filament 23, at one focus of the ellipsoid of revolution, pass through the red or green filter 49 and strike the ellipsoidal reflecting surface of reflector 12 by which the rays are condensed to pass through first the diapositive 16, then the projection lens 70 at the second focus, and thence to the platen of a plotting table (not shown) of the type currently used with projection plotting equipment or to any other surface upon which it is desired to project the image. The reflecting surface of reflector 12 consists essentially of only that portion of a complete prolate ellipsoid of revolution required for the reflection of a bundle of rays emanating from the light source and encompassing the entire area of the diapositive 16 with the lens as a perspective center for the reflected rays. This system results in the projection of the image of the photograph in a color corresponding to the color of the filter. From this point, on the operation is the same as that of Multiplex instruments, viz: When two correctly oriented overlapping photographs are projected on the platen by means of two projectors one equipped with a red filter, and the other equipped with a green filter, or other combinations of complementary colors, the operator, with the aid of red and green spectacles, sees a stereoscopic model. The plotting table (as T, Fig. 8) provides the means of delineating horizontal and vertical map data, guided by observation of the stereoscopic model. Linearly polarized filters and corresponding spectacles can be substituted for the colored filters and spectacles; or, a synchronized shutter arrangement and corresponding spectacles or other devices of a similar nature can be substituted for the colored filters and spectacles.

Fig. 8 illustrates the manner in which the projectors of this invention are mounted in a "Twinplex" stereoplotting assembly, the details of which, aside from the apparatus used for mounting the particular projector, are fully described in co-pending application Serial No. 234,430 filed June 29, 1951. By way of general description, in the "Twinplex" assembly the series of projectors, instead of being single units as in the conventional double projection instruments known as "Multiplex," consists of units each embodying twin projectors. The diapositives used in the two projectors of any one projector unit correspond respectively to the two exposures made at one camera station. These exposures do not constitute a stereoscopic model. Each exposure must be paired with an exposure of another unit embracing to some extent the same terrain from an adjacent camera station. Physical limitations prevent the simultaneous orientation of both projectors of a single unit, it being obvious that the projection lenses of both projectors of one unit cannot occupy the same location at the same time. Provision is therefore made in the "Twinplex" assembly to allow each of the two projectors utilized to be brought, in turn, into position for forming a stereoscopic model with the appropriate projector of an adjacent projector unit. In either method of orientation of the taking camera, whether along the flight line or normal to it, only one projector of each unit is in use at any one time, but the unit is so assembled and calibrated that once either of the projectors of a unit has been oriented, the other can be brought into orientation.

Referring now to Fig. 8 in greater detail, two units of a series in a "Twinplex" installation oriented for photography along the flight line are generally designated as 101 and 102. Each of these units is provided with two of the projectors of this invention, the unit 101 containing projectors 103 and 104, and the unit 102 containing projectors 105 and 106. The projectors 103 and 104 contain diapositives of aerial pictures taken by coupled oblique-angle photography at one station and the projectors 105 and 106 contain diapositives of pictures similarly taken at the next forward station. Projectors 103 and 106 thus form a stereoscopic pair. One of these projectors is provided with a red filter and the other is provided with a green filter. Accordingly, when these projectors are correctly oriented, overlapping images of the photographs from the two stations are projected on the platen P of a plotting table or device T which can be moved over the map 107. The operator with the aid of red and green spectacles, sees a stereoscopic model. It will be noted that the plotting table is of the type commonly used in "Multiplex" equipment.

In mounting the ellipsoidal reflector projectors in the unit 101, an arcuate arm or bracket 108 is pivotally and adjustably attached to the bearing ring of the projector as shown at 109, and is pivotally attached at its other end as at 110 to means carried by stirrup 111. These brackets are so arranged that each of the two projectors utilized can be brought, in proper sequence, into position for forming a stereoscopic model with an appropriate projector of adjacent projector unit as described above. Thus, projectors 104 and 105 are shown swung out of position while projectors 103 and 106 are being utilized to form the stereoscopic model. Projector 103 would be swung out of position and projector 104 swung into position when the latter is used with a projector of a unit to the left of unit 101. Likewise, projector 106 would be swung out of position while projector 105 is in use. The compactness of these projector units and ease with which they may be swung into and out of position within the stirrup 111 is a great advantage in this type of installation. Thus, with projectors of this type a diapositive may be used which is four times as large in area as a diapositive permitted by conventional projectors utilizing condensing lens systems. Advantages in illumination and freedom from chromatic aberration have already been pointed out.

The remaining features shown in Fig. 8 are only generally described as they are fully described in the aforementioned co-pending application Serial No. 234,430. Thus, the stirrup 111 is mounted for vertical adjustment upon a shaft or column within housing 112. The whole assembly including housing and column with stirrup 111 attached is mounted on a carriage 114 for movement along supporting rails 115. This mount also is provided with means for transverse movement with respect to the supporting carriage 114. Thus, the mount provides for movement along X, Y, and Z axes.

The supporting members 116 are tubular and are used as an air manifold for supplying cooling air to the projectors from fan 117 through individual connecting hoses 118.

It will be understood that the system shown in Fig. 8 is merely illustrative of one of the many applications of the projector of this invention in which its advantages of compactness, optical quality, and increased illumination greatly improve the over-all system.

It will be appreciated from a reading of the foregoing specification that the invention herein described is susceptible of various changes and modifications without departing from the spirit and scope thereof.

What is claimed is:

1. A projector for stereoplotting comprising a housing, an ellipsoidal reflector mounted thereon and spaced slightly therefrom to permit the passage of cooling gases, means for adjusting said reflector with respect to said housing, a light source mounted on said housing and positioned so that it is approximately at one focal point with respect to the ellipsoidal reflecting surface, filter means between said light source and reflecting surface, means for adjusting said light source with respect to said housing, means for permitting passage of cooling gases around said light source, a projecting lens assembly mounted on said housing and positioned so that its nodal area is approximately at the other focal point of said ellipsoidal reflecting surface, means for adjusting the position of said lens assembly with respect to the housing, a diapositive plate, means for mounting said plate within the housing between said reflector and lens, means for adjustable mounting of said projector to provide for rotation about the X, Y and Z axis to permit the orientation required for the precise recovery of the orientation in space of an aerial photograph at the instant of exposure, said housing, reflector, light source, diapositive, and lens being so configurated and arranged that a bundle of light rays emanating from the light source is received by the reflector through a wide angle and is reflected through a smaller angle of at least approximately 90° encompassing substantially the entire area of the diapositive and through the lens as the perspective center, and so that no direct rays from the light source pass through the diapositive to the lens.

2. A projector for Multiplex apparatus for stereoplotting of typographic maps comprising a housing, an ellipsoidal reflector mounted thereon having an ellipsoidal reflecting surface conforming in configuration to a portion of a prolate ellipsoid of revolution which is unsymmetrical with respect to its foci and is not intersected by the major axis, a light source mounted on said housing and positioned so that it is approximately at one focal point with respect to said ellipsoidal reflecting surface, filter means positioned between said light source and said reflecting surface, a projecting lens assembly mounted on said housing and positioned so that its nodal area is approximately at the other focal point of said ellipsoidal reflecting surface, a diapositive plate, means for mounting said plate within the housing between said reflector and lens, said housing, reflector, light source, diapositive plate and lens being so configurated and arranged that a bundle of light rays emanating from the light source is received by the reflector through a wide angle and is reflected through a smaller angle of at least approximately 90° encompassing substantially the entire area of the diapositive and so that no direct rays from the light source pass through the diapositive to the lens, and means for mounting said projector on the projector supporting frame of a Multiplex stereoplotting apparatus whereby the functions of the Multiplex system may be performed with the ellipsoidal reflector projector.

3. In a Twinplex stereoplotting assembly having an orientable unit for supporting twin projectors, the combination of a pair of compact ellipsoidal reflecting projectors, each of said projectors comprising a housing, an ellipsoidal reflector mounted thereon, a projecting lens assembly mounted on said housing and positioned so that its nodal area is at one focal point of the ellipsoidal reflecting surface, a light source mounted on said housing and positioned so that it is at the other focal point of said ellipsoidal reflecting surface, said housing, reflector, light source and lens being so configurated and disposed that a bundle of light rays emanating from the light source is received by the reflector through a wide angle and is reflected through a smaller angle of at least approximately 90° to the lens, a diapositive plate, and means for mounting said diapositive plate within said housing so that the reflected bundle of rays encompasses the entire area of the image on the diapositive; and bracket means for mounting each of said projectors in said orientable unit, said bracket means being pivotal with respect to said orientable unit whereby said projectors may be brought, in turn, into position for forming a stereoscopic model with an appropriate projector of an adjacent unit.

4. In a Twinplex stereoplotting assembly having an orientable unit for supporting twin projectors, the combination of a pair of compact ellipsoidal reflecting projectors, each of said projectors comprising a housing, an ellipsoidal reflector mounted on said housing, a light source mounted on said housing and positioned so that it is at approximately one focal point with respect to the ellipsoidal reflecting surface, filter means between said light source and reflecting surface, a projecting lens assembly mounted on said housing and positioned so that its nodal area is approximately at the other focal point of said ellipsoidal reflecting surface, a diapositive plate, means for mounting said plate within the housing between said reflector and lens, said housing, reflector, light source, diapositive and lens being so configurated and arranged that a bundle of light rays emanating from the light source is received by the reflector through a wide angle and is reflected through a smaller angle of at least approximately 90°, a bearing ring assembly encompassing said lens assembly and having an inner ring fixed to said housing and a rotatable outer ring, and an arcuate bracket pivotally attached at one end to said rotatable bearing ring and pivotally attached at the other end to said orientable unit, said arcuate bracket extending in close proximity to the bottom of said projector housing and around said light source whereby, by means of their respective arcuate brackets said projectors may be brought, in turn, into position for forming a stereoscopic model with an appropriate projector of an adjacent unit.

References Cited in the file of this patent
UNITED STATES PATENTS

| | | |
|---|---|---|
| 1,275,120 | Ballman et al. | Aug. 6, 1918 |
| 1,763,630 | Hopkins | June 10, 1930 |
| 2,164,847 | Trautmann | July 4, 1939 |
| 2,216,993 | Von Wedel | Oct. 8, 1940 |
| 2,342,115 | Blauvelt | Feb. 22, 1944 |
| 2,415,635 | Hopkins | Feb. 11, 1947 |
| 2,456,333 | Sharp et al. | Dec. 14, 1948 |